Oct. 14, 1958     G. W. CLEVENGER     2,856,600
AUTOMATIC FREQUENCY CONTROL FOR RADAR SYSTEMS
Filed March 11, 1955     2 Sheets-Sheet 1

GLENN W. CLEVENGER
INVENTOR.

BY
Killman and Kerst
ATTORNEYS

United States Patent Office 2,856,600
Patented Oct. 14, 1958

2,856,600

AUTOMATIC FREQUENCY CONTROL FOR RADAR SYSTEMS

Glenn Wendall Clevenger, Baltimore, Md., assignor to Bendix Aviation Corporation, Towson, Md., a corporation of Delaware Application March 11, 1955, Serial No. 493,689

6 Claims. (Cl. 343—17.1)

This invention relates to automatic frequency control and in particular to a means for providing automatic frequency control in radar systems.

Because noise at various frequencies is presented to a receiver, it is desirable to limit the bandwidth of the amplifying system contained therein in order to maintain a high signal-to-noise ratio. If the incoming intelligence signal varies in frequency because of shifts in frequency occurring at the transmitter, it is necessary to control the local oscillator(s) in the receiver so that the signal produced as a result of superheterodying action will not vary sufficiently to fall outside of the limiting bandwidth of the amplifying system. The present invention provides a means for performing this operation in a radar receiver.

In a radar receiver, the general concensus is that the desired bandwidth should be equal to or slightly greater than the reciprocal of the pulse duration. From this, it is obvious that a pulse of long duration is desirable for a large signal-to-noise ratio. The lengthening of the pulse is limited by the accuracy necessary, but when extended, a further benefit is derived. This further benefit is that as sensitivity of a transmitted pulse is dependent on the energy transmitted, and not the amplitude of the transmitted pulse, the amplitude may be decreased when the pulse is lengthened without a loss in sensitivity. This will permit the use of less equipment and space to produce the lower amplitude pulse.

When an echo pulse is received in a radar receiver, the local oscillators should be operating at frequencies so that the intermediate frequency signals produced by the mixing stages will be at frequencies within the bandwidths of the intermediate frequency amplifiers. It has been customary to accumulate a history of the frequencies of several of the previously transmitted pulses, and to use this information in adjusting the local oscillators. This will provide a satisfactory means when the antenna does not experience a large change between transmitted pulses, but when the duty cycle is small, the radio frequency transmitted from pulse to pulse may be sufficiently different in frequency to make the information obtainable from previous pulses useless when considered as intelligence for setting the local oscillator(s). The changes in radio frequency may be accredited to the fact that the antenna has moved sufficiently between pulses so that relatively large changes in the loading presented to the transmitter occur because of changes in radio frequency circuitry, in sections of the radome exposed to the antenna, or other types of pulling.

If an attempt is made to adjust the local oscillator(s) during the transmission of the pulse, several problems will be present. One will be the difficulty of performing the adjusting action within the pulse duration. As the pulses are short in duration, the action would have to be a rather rapid one. A second problem, assuming the oscillators are adjusted within the duration of the transmitted pulse, is the maintaining of these conditions for the time necessary for the pulse to travel to the target and return. Because of drifting and other variations, this presents limitations.

Therefore, it is apparent that a pulse of long duration is desirable to provide a system using less equipment and space, and to permit the use of a narrow band amplifying system which will increase the signal-to-noise ratio. Further, it is apparent that when using narrow band amplifiers in a radar system having a low duty cycle, it is not feasible to depend on the history of previous pulses for obtaining information necessary for adjusting the local oscillator(s).

The present invention provides a means for adjusting the oscillators for each transmitted pulse in a manner such that the local oscillators will be operating properly when the echo pulse is received. Two separate double superheterodyne intermediate frequency channels are used in a manner such that one channel is for the transmission of the echo signal while the other channel performs the AFC action. A delay line for storing energy and a closed loop system for fine control are provided in the AFC channel.

An object of the present invention is to provide a means for controlling the frequencies of the local oscillators of a radar receiver on a pulse to pulse basis.

Another object of the present invention is to provide a means for controlling the frequencies of the local oscillators of a radar receiver on a pulse to pulse basis in a manner other than that necessitating the performance of the adjustment within the pulse duration.

A still further object of the present invention is to provide a means capable of maintaining the proper frequencies of operation of the local oscillators within a radar receiver between successive pulses.

Referring to the drawings.

Figure 1:
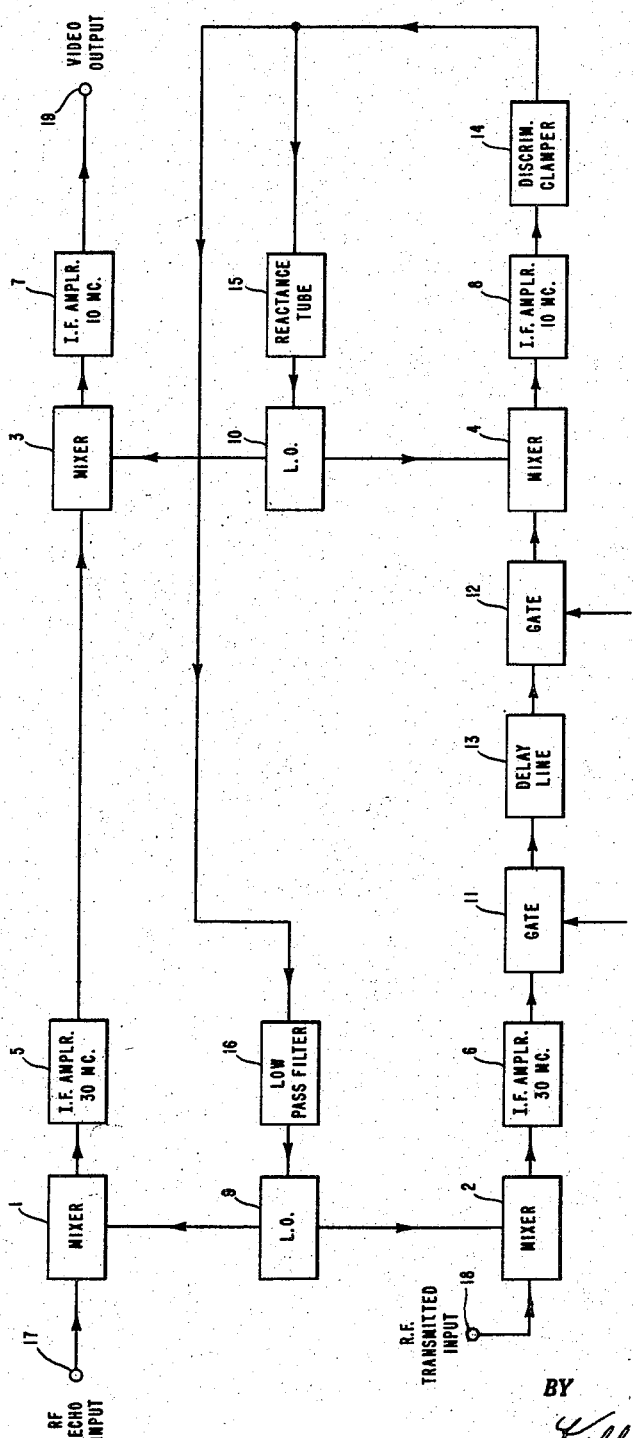
Fig. 1 depicts a block diagram of a system incorporating the invention.

Referring in particular to Fig. 1, the block diagram consists of two intermediate frequency channels comprising mixers 1, 2, 3 and 4, 30 mc. intermediate frequency amplifiers 5 and 6, 10 mc. intermediate frequency amplifiers 7 and 8, and local oscillators 9 and 10. Two gating circuits 11 and 12 operate to permit signals to enter and leave a sonic delay line 13. A discriminator clamper 14 and a reactance tube 15 operate on the output from the amplifier 8 to provide a control signal to the local oscillator 10. A low pass filter 16 is a coupling link between the discriminator clamper 14 and the local oscillator 9. A radio frequency echo input terminal 17, a radio frequency transmitted input terminal 18 and a video output terminal 19 are also provided for inserting and obtaining signals.

Figure 2:
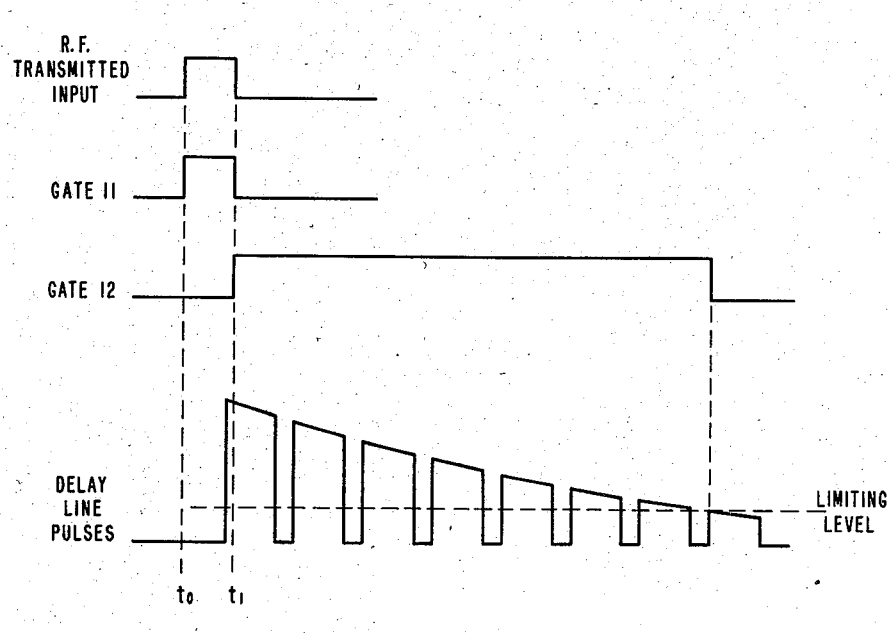
Fig. 2 illustrates the waveforms at several points in the system of Fig. 1.

The operation of the AFC intermediate frequency channel of the system, with the use of the waveforms of Fig. 2, is as follows: When a pulse is transmitted, a portion of the energy is coupled into the radio frequency transmitted input terminal 18, which injects the signal into the mixer 2. A signal from the local oscillator 9 is also injected into the mixer 2. The output of the mixer 2 is amplified in amplifier 6 and coupled into the delay line 13 by the gating circuit 11. This is illustrated in Fig. 2, between times $t_0$ and $t_1$. When the input signal ceases, the gating circuit 11 is opened and the gating circuit 12 is closed. The pulse will be reflected back and forth or recirculated in the delay line 13 with its energy being dispersed in an exponential fashion determined by the characteristics of the line. The round trip time of the delay line 13 should be somewhat longer than the pulse duration. A series of pulses, as shown in Fig. 2, will appear at the output of the line 13. When the gating circuit 12 is closed the pulses from the delay line 13 are coupled to the mixer 4. The intermediate frequency signals in these pulses are at the frequency of the intermediate frequency signals in the pulses from the amplifier 6. The output of the local oscillator 10 is also coupled into the mixer 4, with the output of the mixer 4 being amplified in amplifier 8. The output of the amplifier 8 is coupled into the discriminator clamper 14 wherein a direct current signal proportional to frequency is produced. This direct current signal, in cooperation with the reactance tube 15, controls the frequency of the signal from the local oscillator 10.

It will be noticed that the mixer 4, amplifier 8, discriminator clamper 14, reactance tube 15 and oscillator 10 form a closed loop system, with the output of the delay line 13 providing the input thereto. The output from this loop is the signal obtained from the oscillator 10, which, as in all closed loop systems, is relatively independent of changes in gain and other drifts occurring in the elements within the loop.

A portion of the output signal from the discriminator clamper 14 is coupled via the low pass filter 16 to the oscillator 9. This will cause the oscillator 9 to follow slow radio frequency drifts occurring over a number of successive pulses.

When the echo pulse is received, the local oscillators 9 and 10 will be producing signals so that when introduced into the mixers 1 and 3 respectively, the resulting signals will be passed by the amplifiers 5 and 7.

To illustrate the operation of the system, assume that under desired conditions the frequency of the transmitted signal is $F_1$, the frequency of the signal from the oscillator 9 is $F_2$ (so that $F_1-F_2$ equals 30 mc.), and the frequency of the signal from the oscillator 10 is $F_3$ (so that 30 mc.$-F_3=10$ mc.). Assume further that the bandwidths of the amplifiers 6, 8 and 5 are 4 mc. and that the bandwith of the amplifier 7 equals or slightly exceeds the reciprocal of the pulse duration. If a radio frequency transmitted signal at a frequency of $F_1$ is coupled into terminal 18, and the oscillators 9 and 10 are oscillating at frequencies of $F_2$ and $F_3$ respectively, no changes in their operation will be necessary to permit the echo pulse coupled into terminal 17 to pass through mixers 1 and 3 and amplifiers 5 and 7. If the next radio frequency transmitted signal is at a frequency of $F_1+2$ mc., then the frequencies of the signals from the oscillators will change during the period between the transmitting of the pulse and the reception of the echo pulse. The oscillator 10 will change rapidly. In fact, if infinite gain was obtainable in the closed loop, the oscillator 10 would change 2 mc. The oscillator 9 will change by an amount determined by the time-constant of the filter 16 and the elapsed time between transmission and reception of the pulse. If the oscillator 10 was corrected for the entire amount of deviation, then the oscillator 9 should not change an appreciable portion of the bandwith of the amplifier 7 for any ranging cycle. From this, it is readily seen that the amplifier 5 must have a bandwith approximately equal to that of amplifiers 6 and 8. The signal presented to the amplifier 7 will be within the bandwith of this amplifier.

The use of the feedback through the filter 16 to control the oscillator 9 is not necessary if the transmitter drift does not cause the signal to appear outside of the ranges of the amplifiers 5 and 6.

Although various frequencies and bandwidths have been assumed in the specification and illustrated in the drawings, it is not meant to limit the invention to these frequencies as it is obvious that many combinations of frequencies and bandwidths may be employed.

Although a particular embodiment of the invention has been illustrated and discussed, it is to be understood that this is not meant to limit the scope of the invention as it may be embodied in various forms.

What is claimed is:

1. In a radar system having a transmitter and receiver, means in the said receiver for controlling the frequency of a local oscillator, comprising: two intermediate frequency channels; each of said channels comprising two superheterodyne mixers; said mixers of one of said channels being respectively identical to the said mixers of the remaining of said channels; two oscillators; means joining the output of one of the said oscillators to the oscillator inputs of a pair of the said identical mixers; means joining the output of the remaining of the said oscillators to the oscillator inputs of the remaining pair of the said mixers; a sonic delay line; means connecting the said delay line between the output of the first of said mixers and the signal input of the second of said mixers in one of the said channels; means connecting the output of the last said mixer to the one of the said oscillators connected to the last said mixer so as to control the frequency thereof; means connecting a portion of the transmitted signal into the said first mixer of the last mentioned of the said channels; means connecting the echo signal into the first of said mixers in the remaining of said channels; and means connected to the output of the second of the said mixers in the said remaining channel to provide a signal therefrom.

2. In a radar system having a transmitter and receiver, means in the said receiver for controlling the frequencies of local oscillators, comprising: two intermediate frequency channels; each of said channels comprising two superheterodyne mixers; said mixers of one of said channels being respectively identical to the said mixers of the remaining of said channels; two oscillators; means joining the output of one of the said oscillators to the oscillator inputs of a pair of the said identical mixers; means joining the output of the remaining of the said oscillators to the oscillator inputs of the remaining pair of the said mixers; a sonic delay line; means connecting the said delay line between the output of the first of said mixers and the signal input of the second of said mixers in one of the said channels; means connecting the output of the last said mixer to each of the said oscillators so as to control the frequencies thereof; means connecting a portion of the transmitted signal into the said first mixer of the last mentioned of the said channels; means connecting the echo signal into the first of said mixers in the remaining of said channels; and means connected to the output of the second of the said mixers in the said remaining channel to provide a signal therefrom.

3. In a radar system having a transmitter and receiver, means in the said receiver for controlling the frequency of a local oscillator, comprising: two intermediate frequency channels; each of said channels comprising two superheterodyne mixers; said mixers of one of said channels being respectively identical to the said mixers of the remaining of the said channels; two oscillators; means joining the output of one of the said oscillators to the oscillator inputs of a pair of the said identical mixers; means joining the output of the remaining of the said oscillators to the oscillator inputs of the remaining pair of the said mixers; a sonic delay line; said delay line having a round-trip time longer than the duration of the transmitted radar pulse and capable of providing a series of output pulses during a transmitted pulse period; two gating means; means connecting one of the said gating means between the output of the first of the said mixers in one of the said channels and the input of the said delay line; means connecting the remaining of the said gating circuits between the output of the said delay line and the signal input terminal of the remaining of the said mixers in the last mentioned channel; means connecting the output of the last said mixer to the one of the said oscillators connected to the said last mixer so as to control the frequency thereof; means connecting a portion of the transmitted signal into the said first mixer of the last mentioned of the said channels; means connecting the echo signal into the first of said mixers in the remaining of said channels; and means connected to the output of the second of the said mixers in the said remaining channel to provide a signal therefrom.

4. In a radar system having a transmitter and receiver, means in the said receiver for controlling the frequencies of local oscillators, comprising: two intermediate frequency channels; each of said channels comprising two superheterodyne mixers; said mixers of one of said channels being respectively identical to the said mixers of the remaining of the said channels; two oscillators; means joining the output of one of the said oscillators to the oscillator inputs of a pair of the said identical mixers; means joining the output of the remaining of the said oscillators to the oscillator inputs of the remaining pair of the said mixers; a sonic delay line; said delay line having a round-trip time longer than the duration of the transmitted radar pulse and capable of providing a series of output pulses during a transmitted pulse period; two gating means; means connecting one of the said gating means between the output of the first of the said mixers in one of the said channels and the input of the said delay line; means connecting the remaining of the said gating circuits between the output of the said delay line and the signal input terminal of the remaining of the said mixers in the last mentioned channel; means connecting the output of the last said mixer to each of the said oscillators so as to control the frequencies thereof; means connecting a portion of the transmitted signal into the said first mixer of the last mentioned of the said channels; means connecting the echo signal into the first of said mixers in the remaining of said channels; and means connected to the output of the second of the said mixers in the said remaining channel to provide a signal therefrom.

5. In a radar system having a transmitter and receiver, means in the said receiver for controlling the frequency of a local oscillator, comprising: two intermediate frequency channels; each of said channels comprising two superheterodyne mixers; said mixers of one of said channels being respectively identical to the said mixers of the remaining of the said channels; two oscillators; means joining the output of one of the said oscillators to the oscillator inputs of a pair of the said identical mixers; means joining the output of the remaining of the said oscillators to the oscillator inputs of the remaining pair of the said mixers; a sonic delay line; said delay line having a round-trip time longer than the duration of the transmitted radar pulse and capable of providing a series of output pulses during a transmitted pulse period; two gating means; means connecting one of the said gating means between the output of the first of the said mixers in one of the said channels and the input of the said delay line; means connecting the remaining of the said gating circuits between the output of the said delay line and the signal input terminal of the remaining of the said mixers in the last mentioned channel; means connecting the output of the last said mixer to the one of the said oscillators connected to the said last mixer so as to control the frequency thereof; last said means comprising a discriminator clamper and a reactance tube; means connecting a portion of the transmitted signal into the said first mixer of the last mentioned of the said channels; means connecting the echo signal into the first of said mixers in the remaining of said channels; and means connected to the output of the second of the said mixers in the said remaining channel to provide a signal therefrom.

6. In a radar system having a transmitter and receiver, means in the said receiver for controlling the frequencies of local oscillators, comprising: two intermediate frequency channels; each of said channels comprising two superheterodyne mixers; said mixers of one of said channels being respectively identical to the said mixers of the remaining of the said channels; two oscillators; means joining the output of one of the said oscillators to the oscillator inputs of a pair of the said identical mixers; means joining the output of the remaining of the said oscillators to the oscillator inputs of the remaining pair of the said mixers; a sonic delay line; said delay line having a round-trip time longer than the duration of the transmitted radar pulse and capable of providing a series of output pulses during a transmitted pulse period; two gating means; means connecting one of the said gating means between the output of the first of the said mixers in one of the said channels and the input of the said delay line; means connecting the remaining of the said gating circuits between the output of the said delay line and the signal input terminal of the remaining of the said mixers in the last mentioned channel; means connecting the output of the last said mixer to the one of the said oscillators connected to the said last mixer so as to control the frequency thereof; last said means comprising a discriminator clamper and a reactance tube; means connecting the output of the last said mixer to the remaining of the said oscillators so as to control the frequency thereof; last said means comprising the said discriminator clamper and a low pass filter; means connecting a portion of the transmitted signal into the said first mixer of the last mentioned of the said channels; means connecting the echo signal into the first of said mixers in the remaining of said channels; and means connected to the output of the second of the said mixers in the said remaining channel to provide a signal therefrom.

References Cited in the file of this patent

UNITED STATES PATENTS

| | | |
|---|---|---|
| 2,544,293 | Braden | Mar. 6, 1951 |
| 2,788,450 | Sunstein | Apr. 6, 1957 |